UNITED STATES PATENT OFFICE.

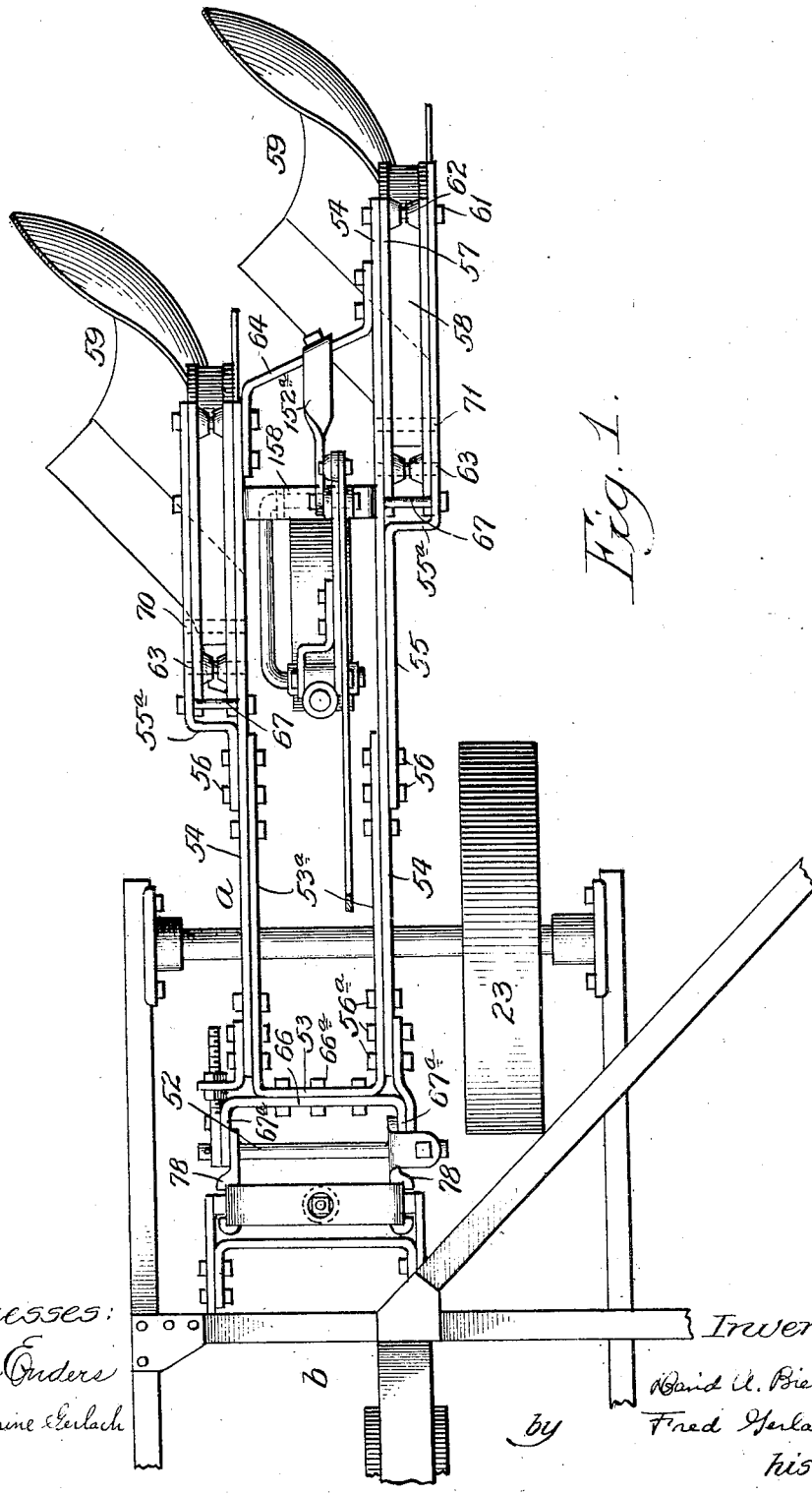

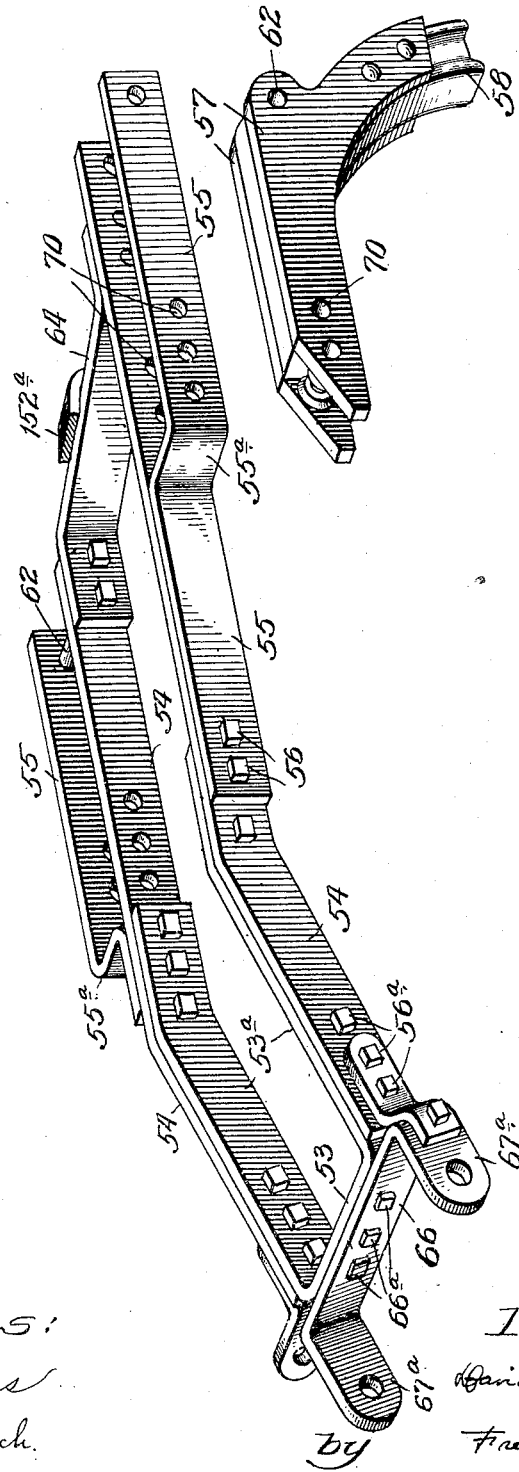

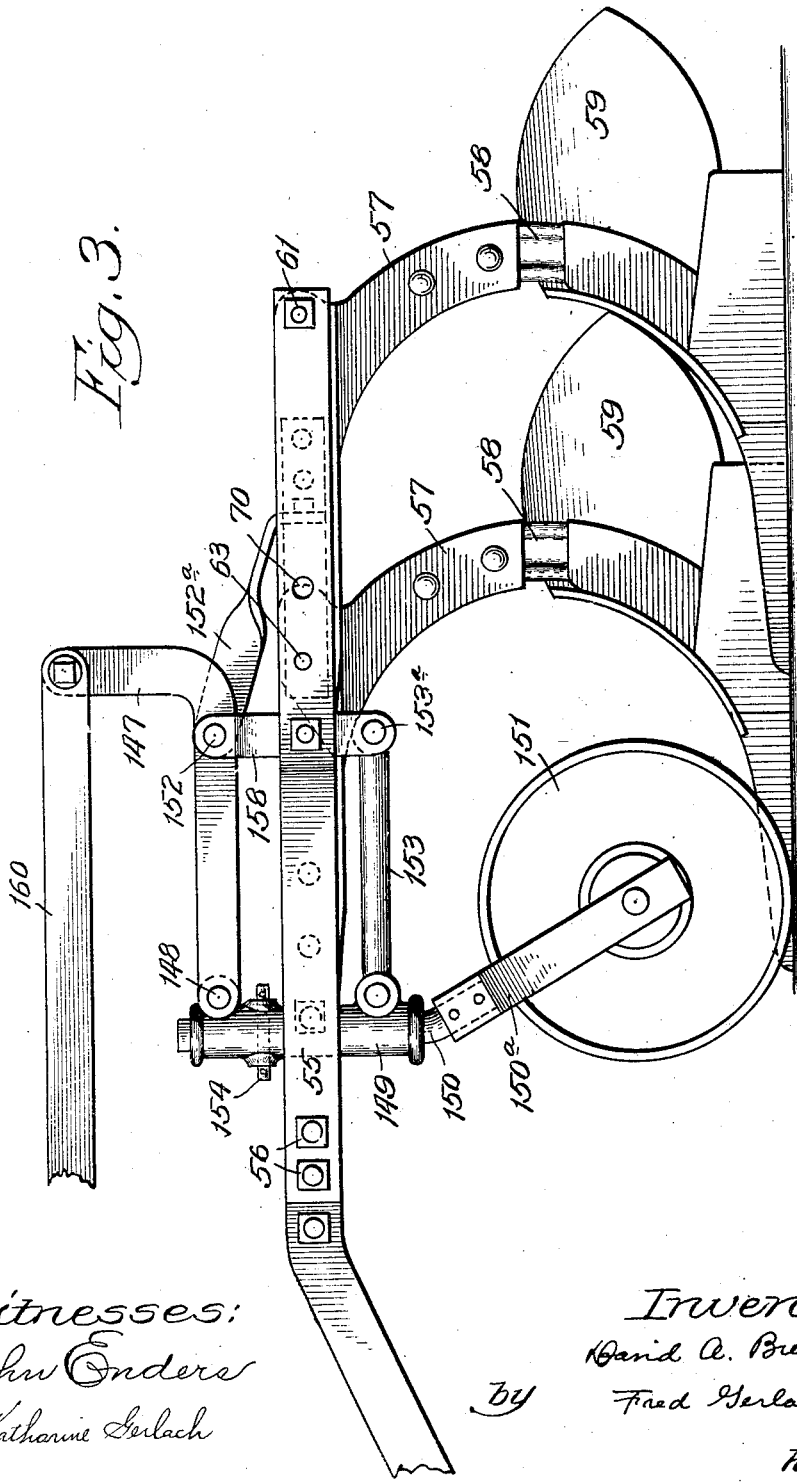

DAVID A. BIEBINGER, OF MOLINE, ILLINOIS, ASSIGNOR TO LA CROSSE PLOW CO., OF LA CROSSE, WISCONSIN, A CORPORATION OF WISCONSIN.

PLOW.

1,246,851.  Specification of Letters Patent.  Patented Nov. 20, 1917.

Original application filed August 24, 1912, Serial No. 716,925. Divided and this application filed November 10, 1913. Serial No. 800,054.

*To all whom it may concern:*

Be it known that I, DAVID A. BIEBINGER, formerly of La Crosse, Wis., a resident of Moline, in the county of Rock Island and State of Illinois, have invented certain new and useful Improvements in Plows, of which the following is a full, clear, and exact description.

The invention relates to plows and more particularly to plow-beams to which the plowshares are attached and whereby they may be raised out of or lowered into the soil.

The invention designs to provide a plow-beam which may be conveniently made up of wrought metal parts, so that it will be strong and durable and well adapted to endure the stresses to which the plow-beams are subjected when employed in tractor-plows, as exemplified in an application for Letters Patent filed by me August 24, 1912, Serial No. 716,925, of which the present application is a division.

The invention consists in the several novel features hereinafter set forth and more particularly defined by claims at the conclusion hereof.

In the drawings: Figure 1 is a plan of a portion of a tractor plow, including a plow-beam embodying the invention. Fig. 2 is a perspective of the plow-beam, one of the plow-standards being shown removed therefrom. Fig. 3 is a side elevation of a portion of the beam plowshares, and the gage-wheel.

The improved plow-beam is shown connected to the frame $b$ of a tractor-plow comprising a carrying-wheel 23, (other carrying wheels not shown). The front end of the plow beam $a$ is pivoted to a pin 52 which is suitably and adjustably connected to the frame $b$. This adjustable connection forms the subject matter of an application filed November 10, 1913, Serial No. 800,055, and, therefore, it is not deemed necessary to set forth the same in detail herein. The pivot-pin 52 is held in the lugs of this adjustable connection.

The plow beam shown is adapted to carry a pair of plowshares 59 at its rear end, its front end being pivotally connected to pin 52, so that the plowshares may be raised and lowered. The plow-beam comprises a U-shaped bar 53. The cross-member of bar 53 extends across the front of the beam and the side members 53$^a$ of said bar extend rearwardly from the front member. A side bar 54 is secured to the outer side of each of the side members 53$^a$ of bar 53. A U-shaped bar 66 has its cross-member rigidly secured against the front of U-shaped bar 53 by bolts 66$^a$ and the arms 67$^a$ of bar 66 extend forwardly and have openings therein for pivot pin 52 to pivotally connect the front end of the beam to the tractor. The plow-beam also comprises outer side bars 55 which are rigidly secured at their rear ends to bars 54 and the side members of U-shaped bar 53 by bolts 56. The front end of bars 55 are secured to the U-shaped bar by bolts 56$^a$. The rear end of each bar 55 is bent away or spaced from one of the bars 54, as at 55$^a$, to form a space for receiving one of the standards for carrying a plowshare 59. A brace 64 has its ends secured to the inner sides of bars 54, respectively, to stiffen the rear end of the beam. This make up of the plow-beam involves the use of bars of wrought metal and results in a strong and durable construction, so that the improved plow-beam will be well adapted for tractor-plows in which the beam is subjected to severe stresses.

Each plowshare 59 is suitably secured to a standard which comprises a curved bar 58 and a pair of plates or brackets 57 secured to the sides of said bar. Each plow-carrying standard is pivotally connected to the rear end of the beam by a bolt 61, which extends through lugs 62 of the brackets 57. The upwardly or forwardly extending portion of each standard is disposed in spaces between bars 55 and bars 54. The front end of each plow-standard is connected to the beam by a wooden break-pin 63 which passes through the brackets 57 of each standard and bars 55 and 54 between which the brackets are held. A hole 70 is formed through each pair of bars 54, 55, brackets 57 and the bar 58 therebetween to receive an additional break-pin 71, if desired. The front ends of brackets 57 abut against a stop bolt 67 to secure the standard against forward turning relatively to the beam. In event of meeting with an obstruction sufficient to break pins 63, 71 or one of them, if but one is used, they will break and permit the plowshare and standard to swing rearwardly, so that the share will ride over the obstruction.

The rear end of each plow-beam is supported by a gage-wheel 151 which is connected to a standard 150 by a fork 150ª. A sleeve 149 is carried by said standard, the latter being rotatable in the sleeve to permit the gage-wheel to caster a limited extent. The pin-slot connection 154 serves to hold the standard and sleeve against relative vertical movement. The sleeve is connected to the plow-beam by means of a link 153, which has one of its laterally turned front ends pivoted on a lug on the lower end of sleeve 149 and its laterally turned rear end pivotally held in a suitable bracket 158 which is secured to the side bars 54 of the beam. The connection between sleeve 149 and the beam also comprises a bell-crank lever 147 which is pivoted, as at 152, to bracket 158 on the beam and to sleeve 149 by pin 148. A brace 152ª connects bracket 158 and pivot bolt 152 to the brace 64. Operation of bell-crank lever 147 causes it to swing about its pivot 148 to raise or lower pivot-bolt 152 and the plow-beam. A link 160 is connected to lever 147 and to any suitable operating mechanism, as well understood in the art. Link 153 is substantially parallel to that portion of lever 147 between pivots 148, 152, and serves to hold the sleeve 149 substantially vertical when the lever is operated. This gage-wheel operating mechanism is claimed in an application filed November 10, 1913, Serial No. 800,053.

From the foregoing description, it will be obvious that the improved plow beam is well adapted for tractor plows and results in strong and durable construction.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a wheel-plow, the combination of a frame, a plow-beam pivotally connected to the frame, comprising a U-shaped bar adjacent its front, having side arms extending rearwardly and a pair of bars rigidly secured in close relation to one of said side arms, one of said bars being bent outwardly from the other to leave a space between them, and a plowshare support disposed in said space and secured between said bars.

2. In a wheel-plow, the combination of a frame, a plow-beam pivotally connected to the frame, comprising a U-shaped bar adjacent its front having side arms extending rearwardly and a pair of bars rigidly secured in close relation to one of said side arms, one of said bars being bent outwardly from the other to leave a space between them, a plowshare support fitting between said bars and a pivotal and breakable connection between said support and said bars.

3. In a wheel-plow, the combination of a frame, a plow-beam pivotally connected to the frame comprising a U-shaped bar adjacent its front having side arms extending rearwardly, a pair of side bars secured to each of said side arms, respectively, one bar of each pair being bent away from the other to leave a space therebetween, and a plowshare support fitting and disposed in each of said spaces, respectively.

4. In a wheel-plow, the combination of a frame, a plow-beam pivotally connected to the frame comprising a U-shaped bar adjacent its front, having side arms extending rearwardly, a pair of side bars secured to each of said side arms, respectively, one bar of each pair being bent away from the other to leave a space therebetween, a plowshare-support fitting and disposed in each of said spaces, respectively, and a pivotal and breakable connection between each of said supports and each pair of bars, respectively.

5. In a wheel-plow, the combination of a frame, a plow-beam pivotally connected to the frame, comprising a U-shaped bar adjacent its front having side arms extending rearwardly, a pair of side bars secured to each of said arms, respectively, one bar of each pair being bent away from the other to leave a space therebetween, a plowshare support fitting and disposed in each of said spaces, respectively, and a brace between the rear end of one pair of bars and the other.

6. In a wheel-plow, the combination of a frame, a plow-beam pivotally connected to the frame, comprising a pair of longitudinal bars spaced apart at their front ends and a U-shaped bar having arms extending forwardly to the pivotal connection of the beam, and a plowshare-support connected to said bars.

7. In a wheel plow, the combination of a frame, a plow-beam pivotally connected to the frame comprising a pair of U-shaped bars, having side arms extending forwardly and rearwardly, respectively, and cross-members rigidly secured together, side bars, and a plowshare-support connected to said side bars.

8. In a wheel-plow, the combination of a frame, a plow-beam pivotally connected to the frame comprising a pair of U-shaped bars having side arms extending forwardly and rearwardly, respectively, and cross-members rigidly secured together, and a pair of side bars secured to each of the rearwardly extending arms, and a plowshare support connected to each pair of side bars.

9. In a wheel-plow, the combination of a frame, a plow-beam pivotally connected to the frame comprising a pair of U-shaped bars having side arms extending forwardly and rearwardly, respectively, cross-members rigidly secured together, a pair of side bars secured to each of the rearwardly extending arms, one of the side bars of each pair being bent laterally away from the other to leave a space therebetween, and a plowshare disposed and fitting between each pair of side bars, respectively.

DAVID A. BIEBINGER.

Witnesses:
 ROBT. O. YOUNG,
 EDWARD L. EAGLE.

Copies of this patent may be obtained for five cents each, by addressing the "Commissioner of Patents, Washington, D. C."